(No Model.)
W. E. BROCK.
VENEERING MOLD.
No. 547,874. Patented Oct. 15, 1895.
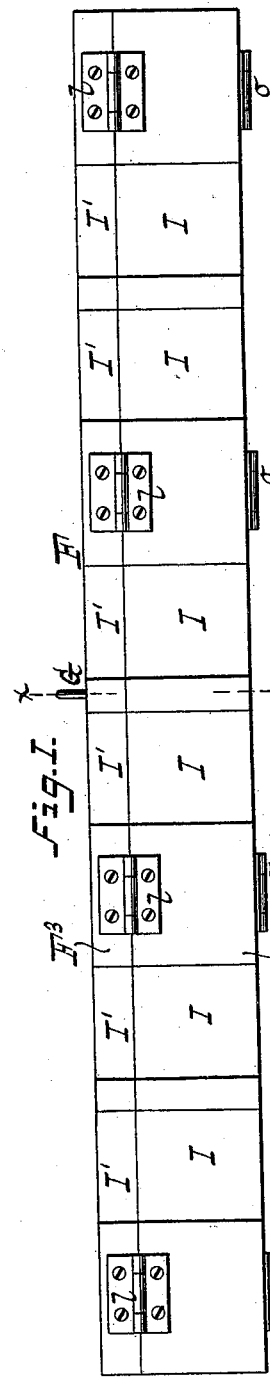
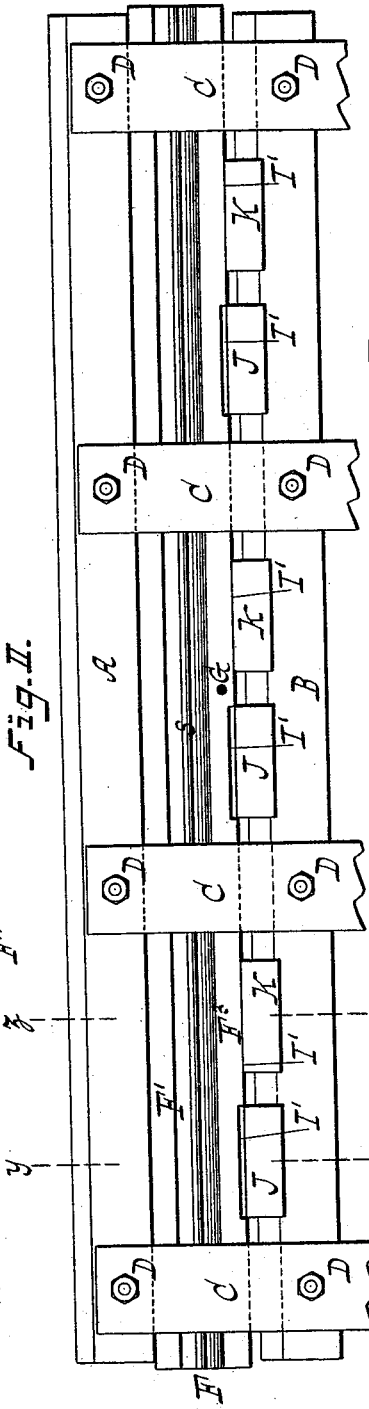
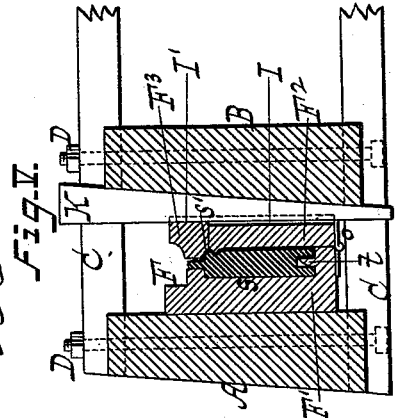
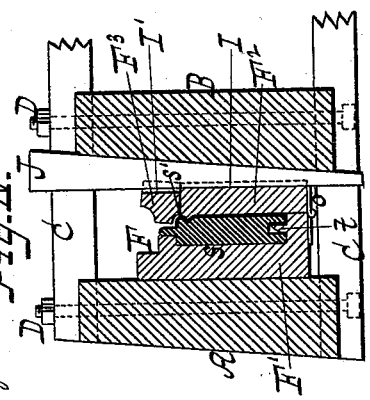
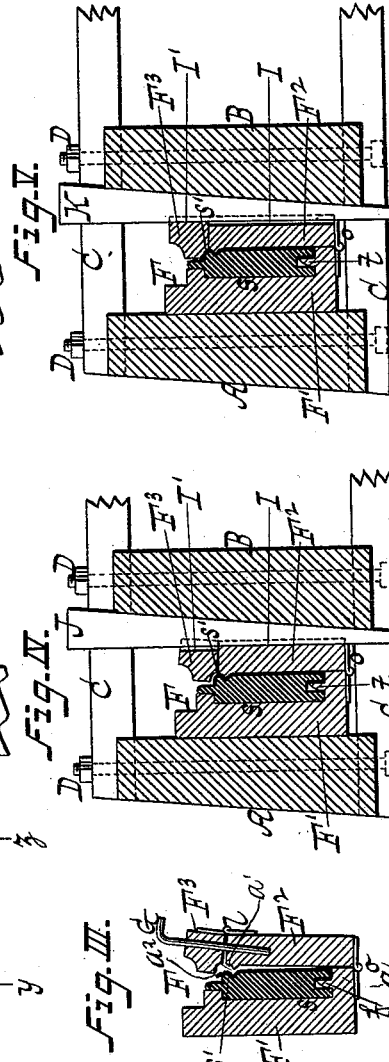
WITNESSES.
Middleton B. Borland
Willard N. Baylis
William E. Brock
INVENTOR.
by Henry M. Brigham
his Attorney

UNITED STATES PATENT OFFICE.

WILLIAM E. BROCK, OF NORTH PLAINFIELD, NEW JERSEY, ASSIGNOR TO THE BROCK VENEERED LUMBER COMPANY, OF NEW JERSEY.

VENEERING-MOLD.

SPECIFICATION forming part of Letters Patent No. 547,874, dated October 15, 1895.

Application filed March 5, 1894. Serial No. 502,445. (No model.)

*To all whom it may concern:*

Be it known that I, WILLIAM E. BROCK, of North Plainfield, county of Somerset, and State of New Jersey, have invented a certain new and useful Improvement in Veneering-Molds, of which the following is a specification.

My invention relates to the art of veneering boards or moldings. The device here shown is designed more particularly for veneering tongue-and-groove and beaded boards or moldings used in house-finishing.

In my improvement I not only press the thin veneer tightly against the board or molding and upon its bead or beads, but also, where a tongue or groove board is to be veneered, turn one edge of the veneer into the groove of the board and the other edge onto the shoulder adjacent to the tongue, thus protecting the edges when a series of boards are placed together from the entrance of moisture, which would be apt to soften the glue and cause the parts to separate, and also prevents the fraying of the veneered edges. I am aware that molds have been used which consisted of two members, which were pressed or clamped together to force the veneer upon the entire surface of the board or molding to be veneered at the same time. It is impossible to veneer a board or molding provided with a bead with such a mold, for the reason that the veneer will be caught and held between the board or molding and the mold on the opposite side of each bead or groove and will be torn when the attempt is made to force it over the bead and into the groove.

My invention consists in providing a mold which consists of a number of members or sections which act consecutively and force the veneer upon so much of the board or molding as can be done at one operation without tearing or breaking the veneer, after which another adjacent section of the mold presses another portion of the veneer against the board or molding, this process being repeated until the operation is complete.

In the accompanying drawings, Figure 1 is a side elevation of a mold or clamping device embodying my invention. Fig. 2 is a top view of said mold or clamping device arranged between lateral abutments or supports. Fig. 3 is a transverse section on the line $x\ x$ of Fig. 1. Fig. 4 is a section on the line $y\ y$ of Fig. 2, and Fig. 5 is a section on the line $z\ z$ of Fig. 2.

Referring by letters and figures to the drawings, A B designate the lateral abutments or supports for the mold or clamping-machine. These abutments or supports are shown in parallel planes and secured together by tie-pieces C and bolts D. The abutments form in effect a frame for the molding device, and it is to be understood that my invention is not limited to the particular construction of the frame or mold described, as it is quite obvious that other means than parts C D may be employed to hold the parts A B in rigid position and that other means than a mold consisting of hinged sections may be used to conform the veneer to and press it upon the board or molding section after section.

F designates the mold or clamping device for conforming the veneer to and pressing it upon the board or molding. The molding comprises separable sections. The mold or clamping device as here shown consists of a section F', which may be termed a "fixed" or "stationary" section, a main section $F^2$, having a swinging movement relative to the section F', and a section $F^3$, having a swinging movement relatively to the main section $F^2$, which is, as here shown, connected at one edge to the section F' by means of hinges $o$, and the section $F^3$ is connected to the section $F^2$ by means of hinges $l$. The section F' has an inwardly-extending portion $a$, provided with a longitudinal rib $f$, designed to enter a groove or a board $s$, for a purpose as will hereinafter appear. The section $F^2$ at its free edge has a longitudinal rib $a'$, conforming to one half the transverse surface of the bead $s'$ of the board, and the section $F^3$ at its edge adjacent to the section $F^2$ has a longitudinal cavity $a^2$, conforming to the other half of the transverse surface of said bead, and the inner surface of said section $F^3$ is designed to be extended approximately to the tongue of the board.

In the operation of veneering with my invention the board to be veneered has a suitable adhesive material applied to it, and the veneer is necessarily somewhat wider than the board or molding to which it is to be applied. The veneer is then laid in the mold in the device illustrated in the drawings. The board is forced in the section F', so that one end of the veneer is forced by the rib $f$ into and against the wall of the groove of the board. Then the section F² is forced toward the section F' to press the veneer against the surface of the board, as shown in Fig. 4, and after section F² has pressed the veneer closely against the board up to the center of the bead $s'$ the other section F³ is brought into operation and the balance of the veneer forced tightly over the bead and against the shoulder adjacent to the tongue of the board.

In the initial operation of forcing the veneer into the groove of the board by the rib $f$ the sections F² and F³ are held slightly open, so that the veneer may be free to slide between these sections and the board, in order that the same may not be torn and broken, and while the section F² is forcing the veneer upon the board and over the portion of the bead the section F³ is held slightly open or at an angle with relation to the section F², as shown in Fig. 3, in order that the veneer may be free to slide or move freely between the surface of the board and the inner surface of section F³, and thus will not be torn or broken. Any desired means may be employed for clamping the mold-sections together. As a convenient means for this purpose I may employ wedges J K. The wedges J, by bearing against the inner surface of an abutment and against the outer surface of the mold-section F², are designed to force the said section against the work, and after this shall have been done the wedges K are brought into service to force the section F³ against the work. In order that the wedges J may freely pass the section F³ without imparting motion thereto, I have provided the said section F³ with transverse grooves I', arranged within or beyond the wedge-bearing surface I of the section F. Fig. 2 plainly shows the manner of placing the wedges.

In a suitable hole passing through the section F³ and into the section F² is fitted a pin G, which holds the said section F³ in a partially-raised position and so that the same is held away from the veneer and the board while the section F² is operating. This pin G is removable and is withdrawn before the wedges K are brought into service to force section 3 against the work.

I do not desire to limit myself to molds in which the sections are hinged together, as it is obvious that molds composed of sections which are not hinged to each other may be made to operate consecutively to make the veneer conform to and force it against the board or molding.

Having described my invention, what I do claim is—

In a veneering device the combination with lateral abutments of a mold composed of sections having a relative swinging movement, such sections being provided with transverse grooves so formed or cut away that a wedge driven between the lateral abutments and said mold will bear against but one of said sections.

In testimony that I claim the foregoing as my invention I have signed my name, in presence of two witnesses, this 16th day of November, 1893.

WILLIAM E. BROCK. [L. S.]

Witnesses:
   JOHN G. DAVIS,
   M. S. BORLAND.